United States Patent
Muntz et al.

(10) Patent No.: US 6,625,604 B2
(45) Date of Patent: Sep. 23, 2003

(54) NAMESPACE SERVICE IN A DISTRIBUTED FILE SYSTEM USING A DATABASE MANAGEMENT SYSTEM

(75) Inventors: Daniel A. Muntz, Cupertino, CA (US); Christos Karamanolis, Sunnyvale, CA (US); Zheng Zhang, San Jose, CA (US); Mallik Mahalingam, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 313 days.

(21) Appl. No.: 09/803,583

(22) Filed: Mar. 9, 2001

(65) Prior Publication Data

US 2002/0128995 A1 Sep. 12, 2002

(51) Int. Cl.[7] .............................................. G06F 17/30
(52) U.S. Cl. .............................. 707/9; 707/10; 707/100; 710/105; 709/200; 709/201
(58) Field of Search ............................. 707/10, 2, 3, 4, 707/5, 9, 1, 100; 710/105; 709/201, 200

(56) References Cited

U.S. PATENT DOCUMENTS

| | | | | |
|---|---|---|---|---|
| 5,617,568 A | * | 4/1997 | Ault et al. ................... 707/101 |
| 5,689,701 A | * | 11/1997 | Ault et al. ..................... 707/10 |
| 5,974,566 A | * | 10/1999 | Ault et al. ..................... 714/15 |
| 6,026,414 A | * | 2/2000 | Anglin ........................ 707/204 |
| 6,505,241 B2 | * | 1/2003 | Pitts ........................... 709/218 |
| 2002/0026507 A1 | * | 2/2002 | Sears et al. ................. 709/224 |
| 2002/0046295 A1 | * | 4/2002 | Asai ........................... 709/246 |
| 2002/0188605 A1 | * | 12/2002 | Adya et al. ..................... 707/4 |

FOREIGN PATENT DOCUMENTS

| | | | | |
|---|---|---|---|---|
| EP | 0 848 527 | * | 6/1998 | .......... H04L/29/06 |
| EP | 1 052 805 | * | 11/2000 | .......... H04L/12/24 |

* cited by examiner

*Primary Examiner*—Frantz Coby

(57) ABSTRACT

Namespace service in a distributed file system using a database management system. A namespace database is configured on a namespace server with namespace identifiers and associated file location information. The namespace server is separate from the data servers in the distributed file system. A client proxy arrangement interfaces with client applications and with the namespace server to obtain from the namespace server location information associated with files referenced in file access requests and submit storage access requests to the appropriate data servers. The separate namespace server and data servers enhances scalability of the distributed file system.

14 Claims, 6 Drawing Sheets

NAMESPACE SERVICE IN A DISTRIBUTED FILE SYSTEM USING A DATABASE MANAGEMENT SYSTEM

FIELD OF THE INVENTION

The present invention generally relates to distributed file systems, and more particularly to management of file namespace in a distributed file system.

BACKGROUND

Distributed file systems are generally employed for storage of large quantities of data and to reduce input/output (I/O) bottlenecks where there are many requests made for file access. In a distributed file system, the file data is spread across multiple data processing systems. File system control and management of file system meta-data is distributed in varying degrees in different systems.

A desirable characteristic of many distributed file systems is scalability. Scalability is a characteristic that refers to the ease with which a distributed file system can be expanded to accommodate increased data access needs or increased storage needs. For example, as additional users are granted access to the distributed file system, new storage servers may be introduced, and the requests of the additional users may be further spread across the old servers and new servers. The scalability of any distributed file system is limited or enhanced by the system design. Scaling a distributed file system is complicated by the fact that the architecture of the distributed file system may possess inherent bottlenecks that limit the extent to which the system can benefit from additional computation and storage capacity.

The namespace service of a distributed file system provides client applications with location information for the various files in the file system. The location information includes, for example, a server identifier, a storage element identifier, and a storage address. Since a distributed file system generally supports multiple client applications, the namespace service includes logic to maintain coherency and consistency of the namespace data. The coherency and consistency logic may present barriers to the scalability of a distributed file system.

A system and method that address the aforementioned problems, as well as other related problems, are therefore desirable.

SUMMARY OF THE INVENTION

Namespace service in a distributed file system using a database management system is provided in various embodiments of the invention. In one embodiment, a namespace database is configured on a namespace server with namespace identifiers and associated file location information. The namespace server is separate from the data servers in the distributed file system. A client proxy arrangement interfaces with client applications and with the namespace server to obtain from the namespace server location information associated with files referenced in file access requests and submit storage access requests to the appropriate data servers. The separate namespace servers and data servers enhances scalability of the distributed file system.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the present invention are described in terms of specific functions implemented on specific data processing systems. Those skilled in the art will appreciate, however, that various alternative arrangements of data processing systems and various alternative data processing system architectures could be used to implement the invention.

Figure 1:
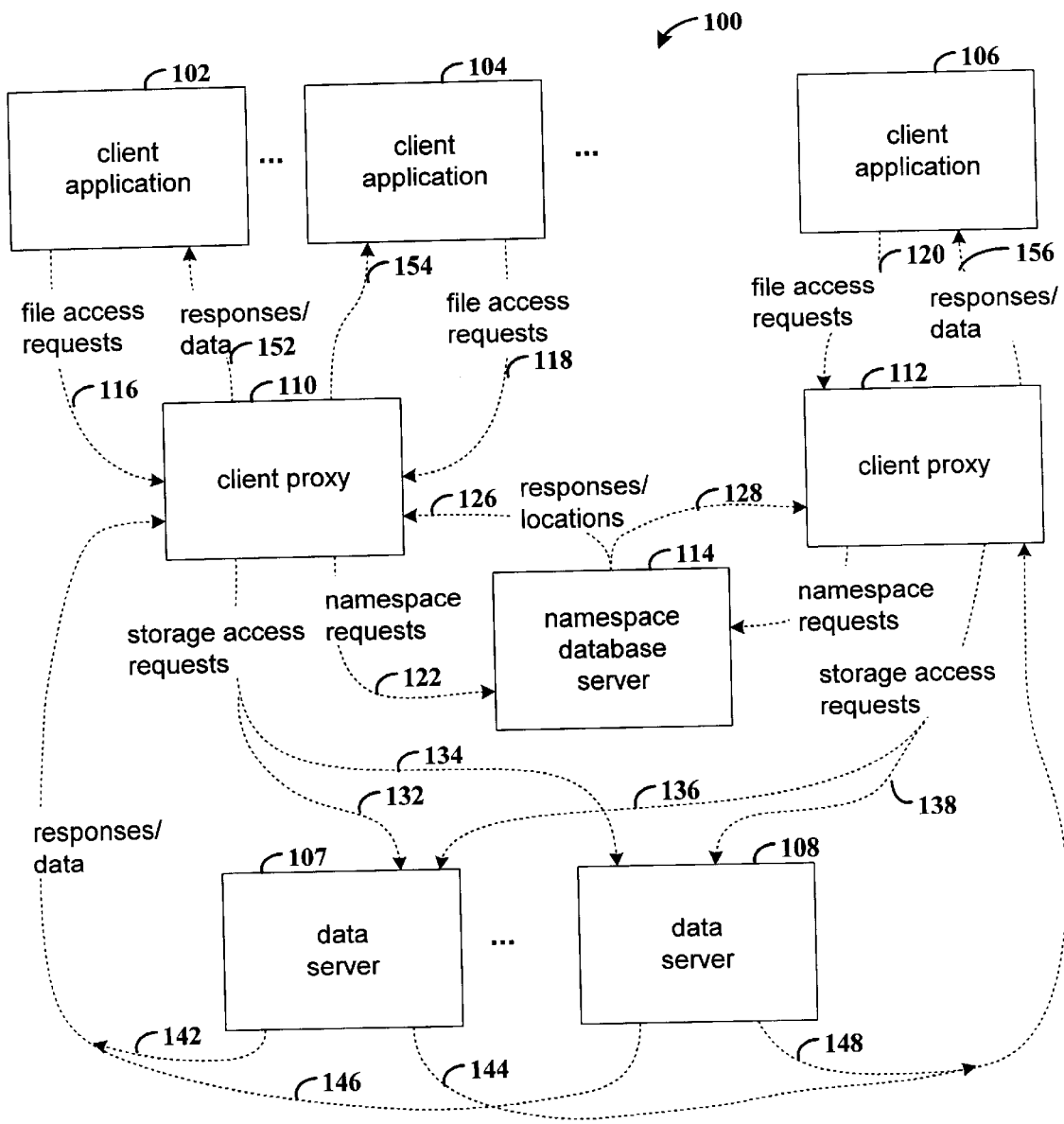
FIG. 1 is a functional block diagram that illustrates the flow of file access requests and file data in accordance with one embodiment of the invention.

FIG. 1 is a functional block diagram that illustrates the flow of file access requests and file data in accordance with one embodiment of the invention. System 100 includes a plurality of client applications (e.g., 102, 104, and 106), a plurality of data servers (e.g., 107 and 108), one or more client proxies (e.g., 110 and 112), and a namespace server 114. The client applications 102–106 issue file access requests to read and write file data that are stored on data servers 107–108. The directional dashed lines in the figure illustrate the flow of requests, responses, and data between the various components in the system.

Each of the client applications 102–106 is coupled to one of client proxies 110 and 112. The client proxies service one or more client applications by receiving file access requests, obtaining from the namespace server 114 location information of files referenced in the access requests, and initiating storage access requests to the appropriate data servers. Responses from the data servers 107–108 are returned to the appropriate client applications. The U.S. patent/application having patent application Ser. No. 09/774,841 now pending, entitled, "EXTENDING A STANDARD-BASED REMOTE FILE ACCESS PROTOCOL AND MAINTAINING COMPATIBILITY WITH A STANDARD PROTOCOL STACK" by Karamanolis et al., filed on Jan. 31, 2001, and assigned to the assignee of the present invention, describes an example embodiment for implementing a client proxy and is hereby incorporated by reference.

To improve scalability and performance, the namespace server 114 manages the namespace data of the distributed file system. In one embodiment, the namespace data is maintained by a database application in conjunction with a conventional, commercially available database management system (DBMS). By deploying the portion of the file system that heavily relies on consistency and coherency control mechanisms on a DBMS that efficiently implements such mechanisms, two goals are achieved. First, the namespace portion of the file system is simplified and can be scaled with the DBMS. Second, the DBMS is designed for the type of task common to namespace operations, for example, lookup and consistency maintenance.

Each of the client applications 102–106 issues file access requests to an associated one of the client proxies 110–112. For example, client applications 102 and 104 issue file access requests (116 and 118) to client proxy 110, and client application 106 issues file access requests (120) to client proxy 112. In response to the file access requests, the client proxies 110 and 112 issue namespace requests (122 and 124) to the namespace server 114. The name space requests include file identifiers from the file access requests. In response to the namespace requests, the namespace server performs database lookup operations to determine location information (e.g., the data servers 107–108) for the specified files. The location data are returned to the client proxies 110 and 112 as shown by lines 126 and 128. Once the client proxies have the location information, storage access requests (132, 134, 136, and 138) are issued to the appropriate data servers 107 and 108. The data servers then return data and/or responses (142, 144, 146, and 148) to the appropriate client proxies 110 and 112, and the client proxies return the data and/or responses (152, 154, and 156) to the appropriate client applications 102–106.

Figure 2:
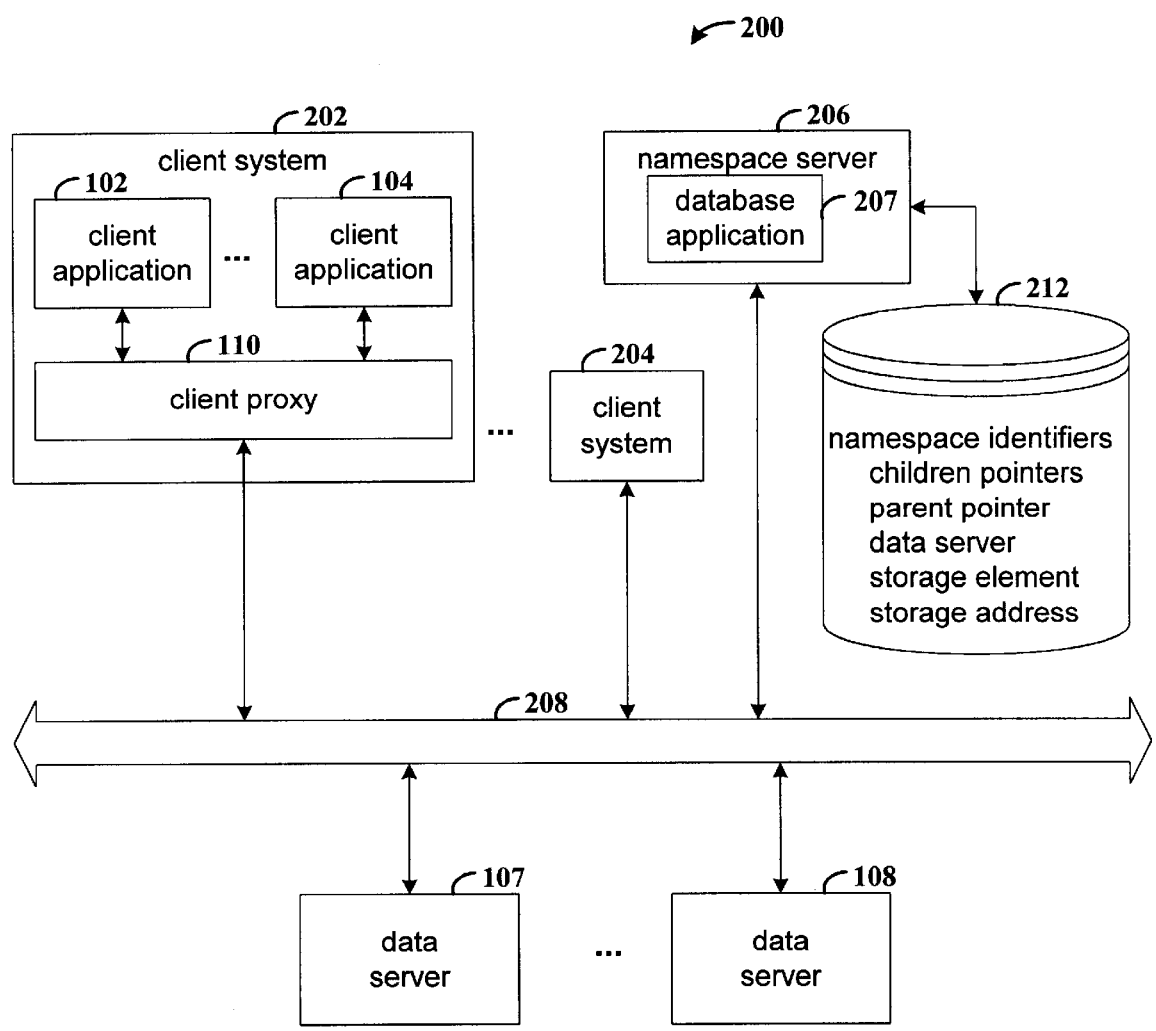
FIG. 2 is a functional block diagram of a system including a namespace server implemented on a database management system (DBMS)

FIG. 2 is a functional block diagram of a system 200 including a namespace server implemented on a database management system (DBMS). System 200 includes client systems 202–204, namespace server 206, and a plurality of data servers 107–108. The client systems, namespace server, and data servers are communicatively coupled via a conventional network arrangement 208, for example a local or wide area network.

Each of the client systems 202–204 is a conventional data processing system that hosts one or more client applications (e.g., 102–104). Client proxy 110 implements the protocol for access to the distributed file system and also interacts with the namespace server 206 and database application 207 to obtain location information for referenced files. The present invention is suitable for various distributed file systems. For example, in one embodiment the standard Network File System (NFS) is adapted to implement the present invention. Those skilled in the art will recognize that various alternative remote and distributed file systems could be adapted to operate in accordance with the present invention.

The namespace server 206 is deployed on a conventional data processing system separate from the data servers 107–108. The hardware configuration of the namespace server depends on the number of file access requests from the client applications. In an example embodiment, the functions of the namespace server are implemented as a database server application 207 in conjunction with a database management system such as those available from ORACLE Corporation. Those skilled in the art will appreciate that other DMBSs are also suitable for the purposes of the present invention. The database server application supports conventional database operations and services concurrent requests from multiple client proxies.

Namespace server 206 manages and provides access to namespace database 212. The namespace database includes information that describes the various namespace identifiers of the distributed file system. "Namespace identifiers" include file names and directory names in the file system. For example, associated with each namespace identifier are pointers to database entries for the children directories if the namespace identifier identifies a directory. Pointers to the children are used to traverse the directory hierarchy of the file system. Pointers to the database entry for the parent directory are also associated with a directory-type namespace identifier. The location information associated with each namespace identifier includes identifiers for the data server and the storage element on which the data referenced by the namespace identifier is stored, along with a storage address. The namespace server returns the namespace identifier information to the client proxy in response to a namespace request.

The data servers 107–108 are data processing systems that provide access to the file data in response to file access requests from the client proxies. The data servers implement the physical portion of the file system.

FIGS. 3–6 contain flowcharts of processing performed by the client proxy in servicing read, write, delete, and rename file access requests. The read, write, delete, and rename operations are described to illustrate the separation of interactions with the namespace server and interactions with the data servers. Those skilled in the art will recognize that the client proxy implements similar processing for interacting with the namespace server for other file access operations.

Figure 3:
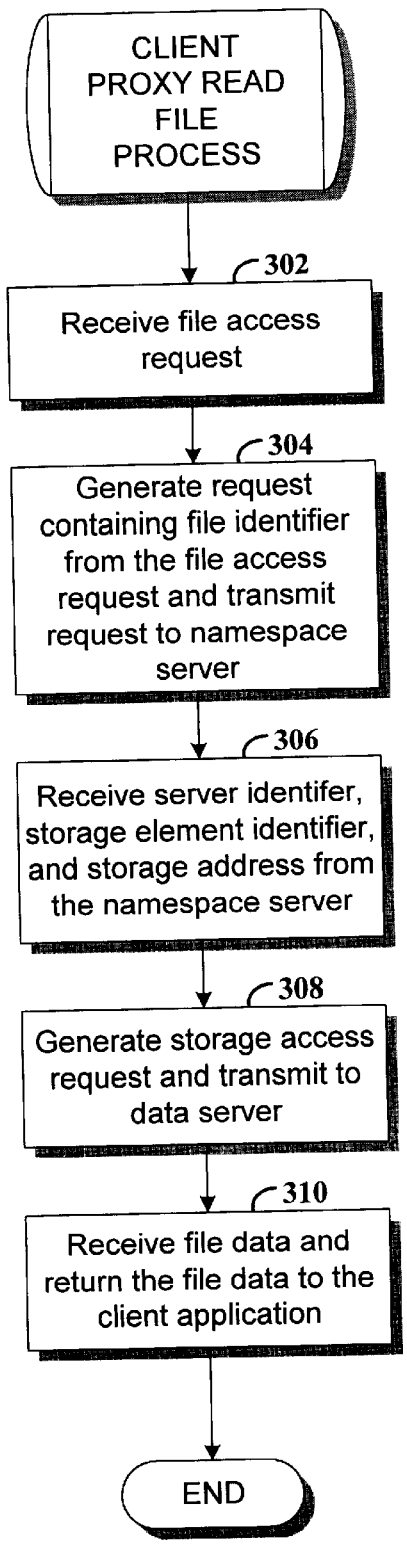
FIG. 3 is a flowchart of a process performed by a client proxy in reading data from a file in response to a request from a client application.

FIG. 3 is a flowchart of a process performed by the client proxy in reading data from a file in response to a request from a client application. At step 302, a read file access request is received from a client application. The read request includes a file identifier from which the data is to be read.

At step 304, the client proxy generates a request for the namespace server, the request including the file identifier from the read request and an operation code indicating a database read. The namespace request is then transmitted to the namespace server, and the client proxy waits for a response. The namespace server reads from the database information that is associated with the file identifier in processing a read request and returns the information to the requesting client proxy.

At step 306, the response is received from the namespace server, the response including an identifier of the data server on which the file is stored, a storage element identifier (e.g., a disk drive), and a storage address. The client proxy then generates a storage access request at step 308, and transmits the request to the appropriate data server. The client proxy then waits for data to be returned from the data server. At step 310, the file data is received from the data server and returned to the client application to complete the read process.

Figure 4:
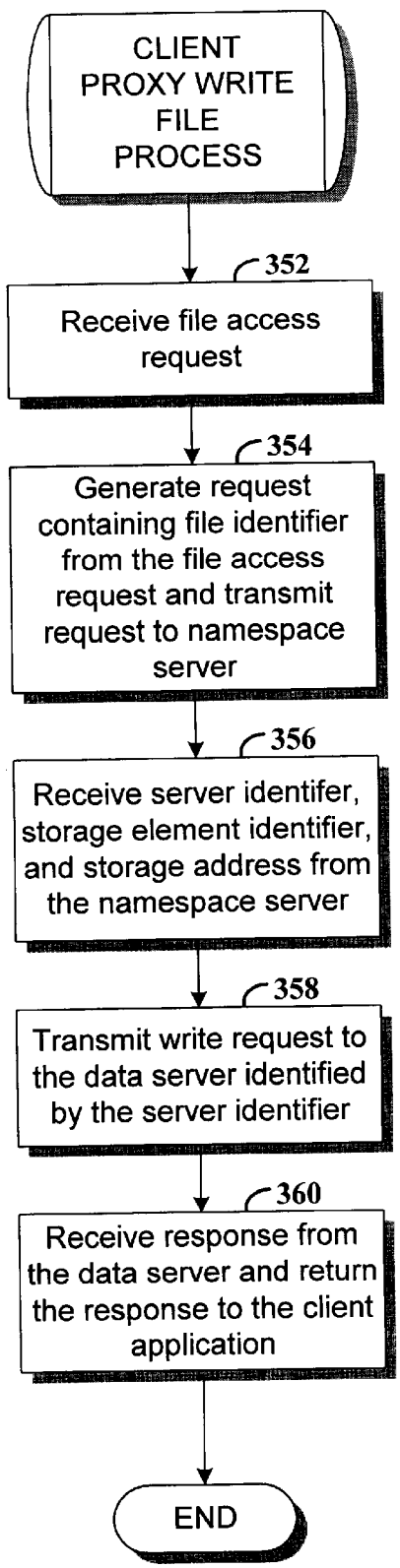
FIG. 4 is a flowchart of a process performed by the client proxy in writing data to a file in response to a request from a client application.

FIG. 4 is a flowchart of a process performed by the client proxy in writing data to a file in response to a request from a client application. At step 352, a write file access request is received from a client application. The write request includes a file identifier to which the data is to be written along with the data to be written to the file.

At step 354, the client proxy generates a request for the namespace server, the request including the file identifier from the write request and a database read operation code. The namespace server request is then transmitted to the namespace server, and the client proxy waits for a response. The namespace server reads from the database information that is associated with the file identifier in processing a read request and returns the location information to the requesting client proxy.

At step 356, the response is received from the namespace server, the response including an identifier of the data server on which the file is stored, a storage element identifier (e.g., a disk drive), and a storage address. The client proxy then generates a write request at step 308, and transmits the request and the data to be written to the appropriate data server. The client proxy then waits for a response to be returned from the data server. At step 310, the response is received from the data server and returned to the client application to complete the write process.

Figure 5:
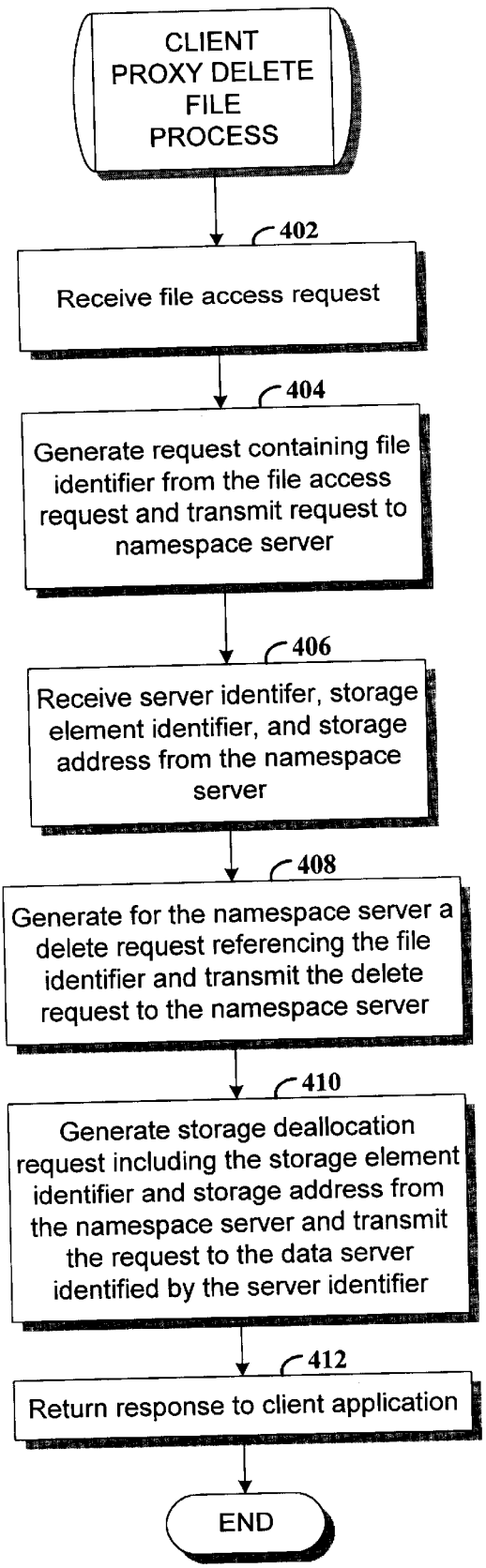
FIG. 5 is a flowchart of a process performed by the client proxy in deleting a file in response to a request from a client application.

FIG. 5 is a flowchart of a process performed by the client proxy in deleting a file in response to a request from a client application. At step 402 the client proxy receives from a client application a file access request that specifies deletion of a file. In response, at step 404 the client proxy generates a namespace request that includes the file identifier. The namespace server reads the information associated with the file identifier and returns the location information to the client proxy.

At step 406, the client proxy receives from the namespace server the location information for the file to be deleted. At step 408, the client proxy generates a second namespace request that includes a delete operation code along with the file identifier and transmits the request to the namespace server. The namespace server then deletes the file identifier and associated information from the namespace database.

At step 410, the client proxy generates a storage de-allocation request to the data server identified by the namespace server. The de-allocation request includes a storage element identifier that identifies the storage element from which the storage space is to be de-allocated and the storage address at which de-allocation is to begin. The de-allocation request is then transmitted to the data server. When the data server returns a response to the client proxy, the client proxy in turn returns a response to the client application at step 412 to complete the file deletion process.

Figure 6:
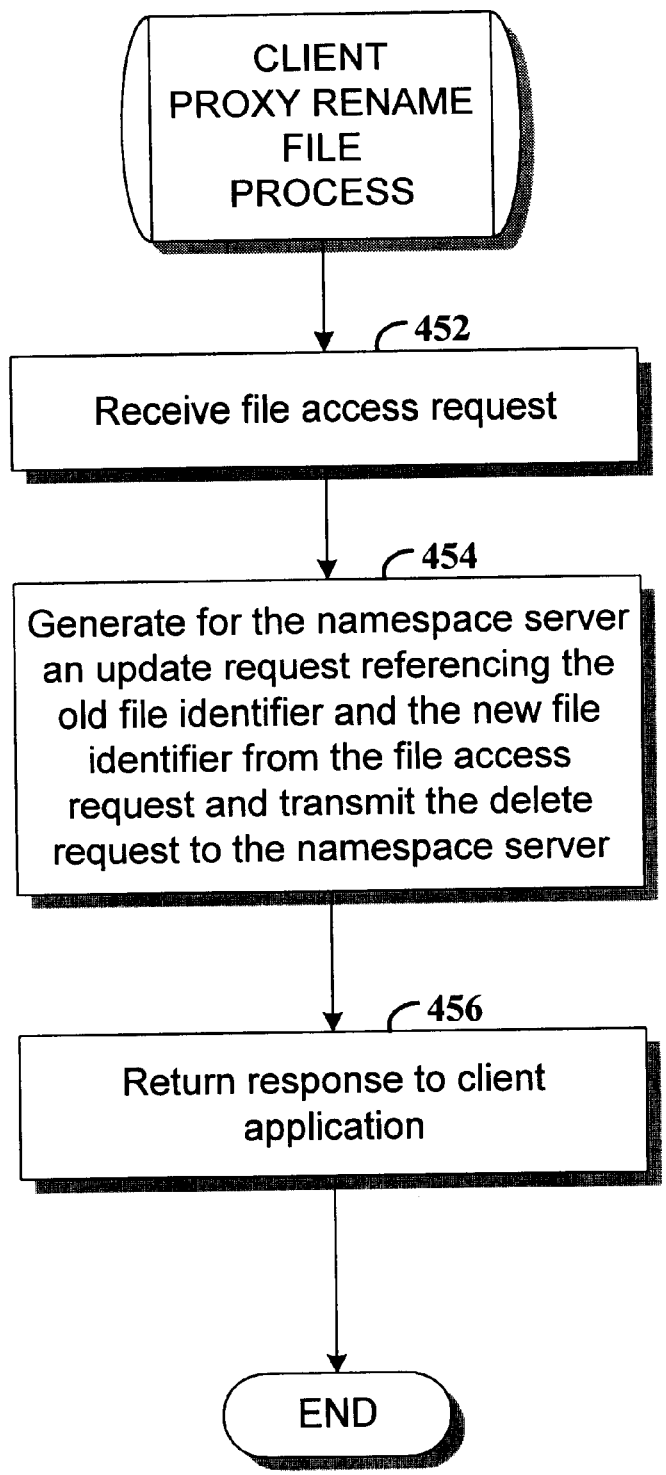
FIG. 6 is a flowchart of a process performed by the client proxy in renaming a file in response to a request from a client application.

FIG. 6 is a flowchart of a process performed by the client proxy in renaming a file in response to a request from a client application. At step 452, the client proxy receives from a client application a file access request that requests renaming a file. At step 454, a namespace request is generated that includes an update operation code, the old referenced file identifier, and the new file identifier. The namespace request is then transmitted to the namespace server. The namespace server updates the database, replacing the old file identifier with the new file identifier. When the client proxy receives a response from the namespace server, a response is then returned to the client application at step 456.

The present invention is believed to be applicable to a variety of distributed and remote files systems and has been found to be particularly applicable and beneficial with NFS-type file systems. Those skilled in the art will appreciate that the invention is not limited to NFS-type file systems, and other aspects and embodiments of the present invention will be apparent from consideration of the specification and practice of the invention disclosed herein. It is intended that the specification and illustrated embodiments be considered as examples only, with a true scope and spirit of the invention being indicated by the following claims.

What is claimed is:

1. A computer-implemented for providing access to data stored on a plurality of data servers in a distributed file system for a plurality of client applications that are executable on a plurality of client data processing systems, each client application coupled to a client proxy arrangement and configured to transmit file access requests to the client proxy arrangement, each file access request including a file name and an operation code, comprising:

configuring a database with file names and associated file location information;

receiving file access requests at the client proxy arrangement;

obtaining from the database location information associated with file names in the file access requests;

transmitting storage access requests from the client proxy arrangement to data servers referenced by the location information, the storage access requests including the operation codes from the file access requests; and providing access to data at the data servers in response to the storage access requests.

2. The method of claim 1, wherein the location information includes a storage element identifier.

3. The method of claim 2, wherein the location information includes a storage address.

4. The method of claim 1, further comprising:

configuring the database with directory names and associated references to children directories; and in response to a directory request including a directory name, obtaining names of children directories associated with the directory name, and providing the names of the children directories to the client proxy arrangement.

5. The method of claim 1, wherein the database and a database application are hosted by a first data processing system and coupled to the client proxy arrangement via a network, further comprising:

transmitting database read requests from the client proxy arrangement to the database application in response to file access requests; and transmitting the location information from the database application to the client proxy arrangement.

6. The method of claim 5, wherein the location information includes a storage element identifier.

7. The method of claim 6, wherein the location information includes a storage address.

8. The method of claim 5, further comprising:

configuring the database with directory names and associated references to children directories; and in response to a directory request including a directory name, obtaining names of children directories associated with the directory name, and providing the names of the children directories to the client proxy arrangement.

9. An apparatus for providing access to data stored on a plurality of data servers in a distributed file system for a plurality of client applications that are executable on a plurality of client data processing systems, each client application coupled to a client proxy arrangement and configured to transmit file access requests to the client proxy arrangement, each file access request including a file name and an operation code, comprising:

means for configuring a database with file names and associated file location information;

means for receiving file access requests at the client proxy arrangement;

means for obtaining from the database location information associated with file names in the file access requests;

means for transmitting storage access requests from the client proxy arrangement to data servers referenced by the location information, the storage access requests including the operation codes from the file access requests; and means for providing access to data at the data servers in response to the storage access requests.

10. A distributed file system for a plurality of client applications that are executable on a plurality of client data processing systems coupled to a data network, each client application configured to generate file access requests, and each file access request including a file name and an operation code, comprising:

a database configured with file names and associated location information;

a data processing system coupled to the network and hosting a database application configured to provide access to the database;

a plurality of data servers coupled to the network, each data server including at least one storage element and configured to read data from and write data to the storage element in response to storage access requests that include operation codes and storage element addresses; and a plurality of client proxy arrangements coupled to the network, each client proxy arrangement configured to receive file access requests from one or more of the client applications, request from the database application location information associated with a file identifier in a file access request, and transmit a storage access request to a data server referenced by the location information, the storage access request including the operation code from the file access request.

11. The system of claim 10, wherein the location information includes a storage element identifier.

12. The system of claim 11, wherein the location information includes a storage address.

13. The system of claim 12, wherein:

the database is further configured with directory names and associated references to children directories; and the database application is configured to, in response to a directory request including a directory name, obtain names of children directories associated with the directory name, and provide the names of the children directories to the client proxy arrangement.

14. The system of claim 10, wherein:

the database is further configured with directory names and associated references to children directories; and the database application is configured to, in response to a directory request including a directory name, obtain names of children directories associated with the directory name, and provide the names of the children directories to the client proxy arrangement.

* * * * *